(12) United States Patent
Kato

(10) Patent No.: US 10,384,624 B2
(45) Date of Patent: Aug. 20, 2019

(54) CASE AND POWER SUPPLY DEVICE

(71) Applicant: Yazaki Corporation, Tokyo (JP)

(72) Inventor: Shinji Kato, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/960,692

(22) Filed: Apr. 24, 2018

(65) Prior Publication Data

US 2018/0361957 A1 Dec. 20, 2018

(30) Foreign Application Priority Data

Jun. 14, 2017 (JP) .................. 2017-116673

(51) Int. Cl.
| | |
|---|---|
| *B60N 2/06* | (2006.01) |
| *B60R 16/027* | (2006.01) |
| *B60R 16/033* | (2006.01) |
| *H02G 11/00* | (2006.01) |
| *B60R 16/02* | (2006.01) |

(Continued)

(52) U.S. Cl.
CPC ........ *B60R 16/0215* (2013.01); *B60N 2/0224* (2013.01); *B60N 2/06* (2013.01); *B60R 16/027* (2013.01); *B60R 16/033* (2013.01); *H02G 3/081* (2013.01); *H02G 11/00* (2013.01); *H02G 11/006* (2013.01); *B60N 2002/0264* (2013.01); *H01B 7/0045* (2013.01)

(58) Field of Classification Search
CPC . B60R 16/0215; B60R 16/027; B60R 16/033; B60N 2/0224; B60N 2/06; H02G 3/081; H02G 11/00; H02G 11/006; H01B 7/0045

USPC .................................................... 174/72 A
See application file for complete search history.

(56) References Cited

U.S. PATENT DOCUMENTS

| | | | |
|---|---|---|---|
| 7,402,044 B2* | 7/2008 | Terada ................. | B60N 2/06 174/72 A |
| 9,219,359 B2* | 12/2015 | Sekino ............. | H01B 7/0045 |

(Continued)

FOREIGN PATENT DOCUMENTS

| | | |
|---|---|---|
| JP | 3000380 U | 8/1994 |
| JP | 2004-299276 A | 10/2004 |

(Continued)

OTHER PUBLICATIONS

Communication dated Apr. 16, 2019, from the Japanese Patent Office in counterpart application No. 2017-116673.

*Primary Examiner* — Andargie M Aychillhum
*Assistant Examiner* — Michael F McAllister
(74) *Attorney, Agent, or Firm* — Sughrue Mion, PLLC

(57) ABSTRACT

Provide is a case that aims at while suppressing upsizing in a height direction to which a load is applied, restraining the application of load to articles accommodated in the accommodating chamber when an external force acts thereon. The case including an accommodating chamber for accommodating an article is provided with an upper wall on which load F acts from above, and an inner surface of the upper wall on the accommodation chamber side is formed into a concave shape. According to this, while suppressing an increase in size in the height direction of the case, it is possible to suppress the application of the load to the article accommodated in the accommodating chamber when the external force acts.

9 Claims, 9 Drawing Sheets

(51) Int. Cl.
*H02G 3/08* (2006.01)
*B60N 2/02* (2006.01)
*H01B 7/00* (2006.01)

(56) References Cited

U.S. PATENT DOCUMENTS

| | | | |
|---|---|---|---|
| 9,765,509 B1* | 9/2017 | DiTullio | ................ E03F 1/003 |
| 2008/0213653 A1* | 9/2008 | Marukawa | .......... H01M 2/1077 |
| | | | 429/72 |
| 2016/0145927 A1* | 5/2016 | Hirakawa | ............. E05F 15/443 |
| | | | 296/1.04 |

FOREIGN PATENT DOCUMENTS

| | | |
|---|---|---|
| JP | 2014-15108 A | 1/2014 |
| JP | 2015-053748 A | 3/2015 |

* cited by examiner

CASE AND POWER SUPPLY DEVICE

TECHNICAL FIELD

The present invention relates to a case having an accommodating chamber for accommodating an article, and a power supply device.

BACKGROUND ART

Generally, in the case of providing electrical equipment on a slide body such as a slide seat of a vehicle, used is a power supply device for supplying electric power from a power source such as a battery or the like to the electrical equipment. The power supply device is installed on the vehicle floor. The power supply device is provided with a wire harness used to electrically connect the power source and electrical equipment, and a case for accommodating the wire harness. In this power supply device, the wire harness is accommodated in the case according to the sliding movement of the slide body, or is drawn out from the case (see Japanese Unexamined Patent Application Publication No. 2015-53748).

PATENT DOCUMENT

Patent Document 1: Japanese Unexamined Patent Application Publication No. 2015-53748

SUMMARY OF THE INVENTION

However, in a conventional power supply device, for example, when a case is stepped on, there was a concern that an upper wall of the case would bend and come into contact with a wire harness when a load is applied to the case.

It is an object of the present invention to provide a case for suppressing upsizing in a height direction, to which a load is applied, and reducing a load being applied to an article accommodated in an accommodating chamber.

In order to solve the above-mentioned problems and achieve the object, a first aspect of the invention is a case including an accommodating chamber for accommodating an article, including an upper wall on which a load acts from above, and an inner surface of the upper wall facing the accommodating chamber is formed into a concave shape.

According to a second aspect of the present invention, in the first aspect of the invention, the inner surface of the upper wall is arched.

According to a third aspect of the present invention, in the second aspect of the present invention, a long side direction and a short side direction are defined on the upper wall, and the inner surface of the upper wall is arched in the short side direction.

According to a fourth aspect of the invention, in the first aspect of the present invention, reinforcing rib portion is formed on an outer surface of the upper wall.

According to a fifth aspect of the invention, in the fourth aspect of the invention, the reinforcing rib portion is formed such that an upper end thereof is positioned on a same plane.

According to a sixth aspect of the present invention, there is provided a power supply device, including an article and the case according to any one of the first to fifth aspects of the invention, the article is a wire harness provided on a vehicle floor and electrically connects a power source and a slide body of the vehicle, so as to supply power to the slide body, and the wire harness accommodated in the accommodating chamber changes in length as the sliding body slides.

According to the first aspect of the present invention, the upper wall on which the load acts from above is provided, and the inner surface of the upper wall facing the accommodating chamber is formed into a concave shape. Here, when the load acts on the upper wall from above, the central portion thereof deforms greatly as compared with the end portion, but since the inner surface of the upper wall on the accommodation chamber side is formed in a concave shape, a distance between the article and the upper wall can be made larger in the central part than in the end parts, suppressing the concern that the load is applied to the article. Therefore, while suppressing up sizing in the height direction of the case, it is possible to reduce the load being applied to the article accommodated in the accommodating chamber when an external force is applied.

According to a sixth aspect of the present invention, there is provided an article and a case, wherein the article is a wire harness that is provided on a vehicle floor, electrically connects the power source and the slide body of the vehicle, and supplies electric power to the slide body, and the length of wire harness which is accommodated in the accommodating chamber changes in accordance with the sliding movement of the slide body. For this reason, in the prior art, there is a concern that when the case is stepped on and the load acts on the case, the upper wall of the case will bend and come into contact with the wire harness, hindering the displacement of the surplus portion of the wire harness. However, since the case has the upper wall, and the inner surface of the upper wall on the accommodating chamber side is formed into the concave shape, it is possible to suppress concern that the load is applied to the wire harness. Accordingly, while suppressing up sizing of the case in the height direction, it is possible to suppress the load being applied to the wire harness accommodated in the accommodating chamber when the external force is applied.

DESCRIPTION OF THE INVENTION

Figure 1:
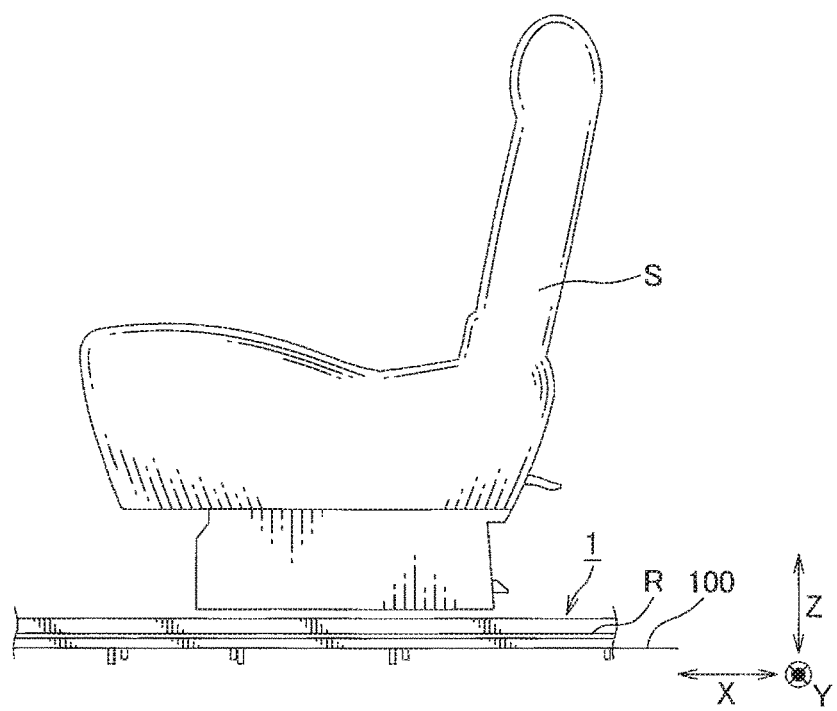
FIG. 1 is a side view showing a seat rail to which a power supply device according to an embodiment of the present invention is applied, and a slide body slidably supported by the seat rail.
Figure 2:
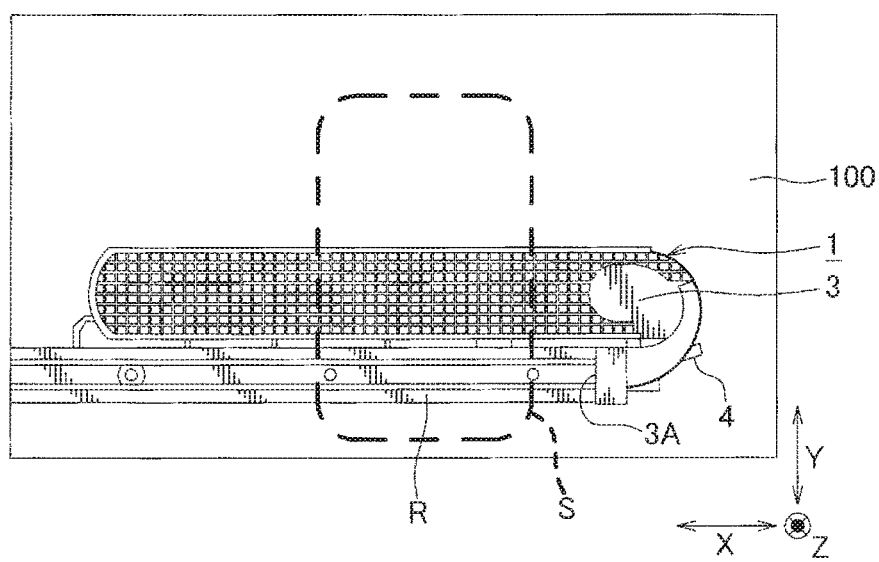
FIG. 2 is a top view showing the power supply device and the seat rail.

Embodiments of the present invention will be described below with reference to the drawings. FIG. 1 shows a seat rail R to which a power supply device 1 according to an embodiment of the present invention is applied, a slide seat S (slide body) slidably supported by the seat rail R. FIG. 2 is a top view showing the power supply device 1 and the seat rail R.

Figure 3:
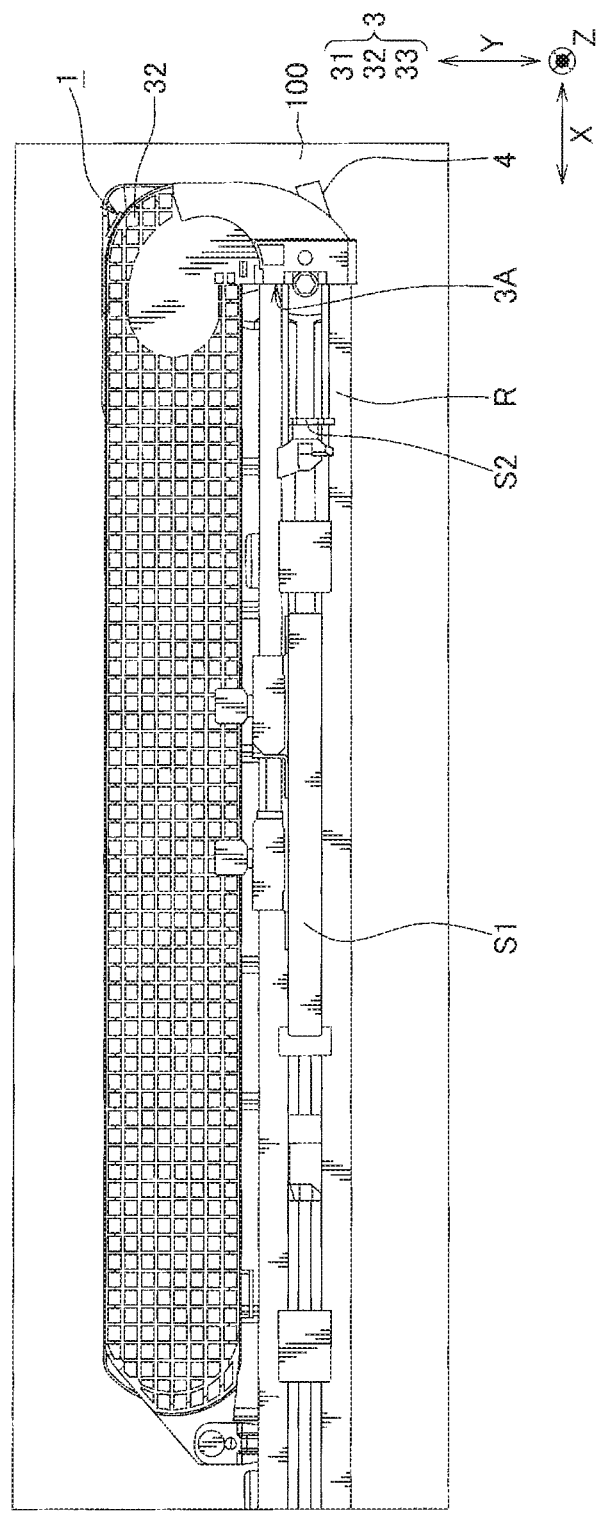
FIG. 3 is an enlarged view of the power supply device and the seat rail shown in FIG. 2.
Figure 4:
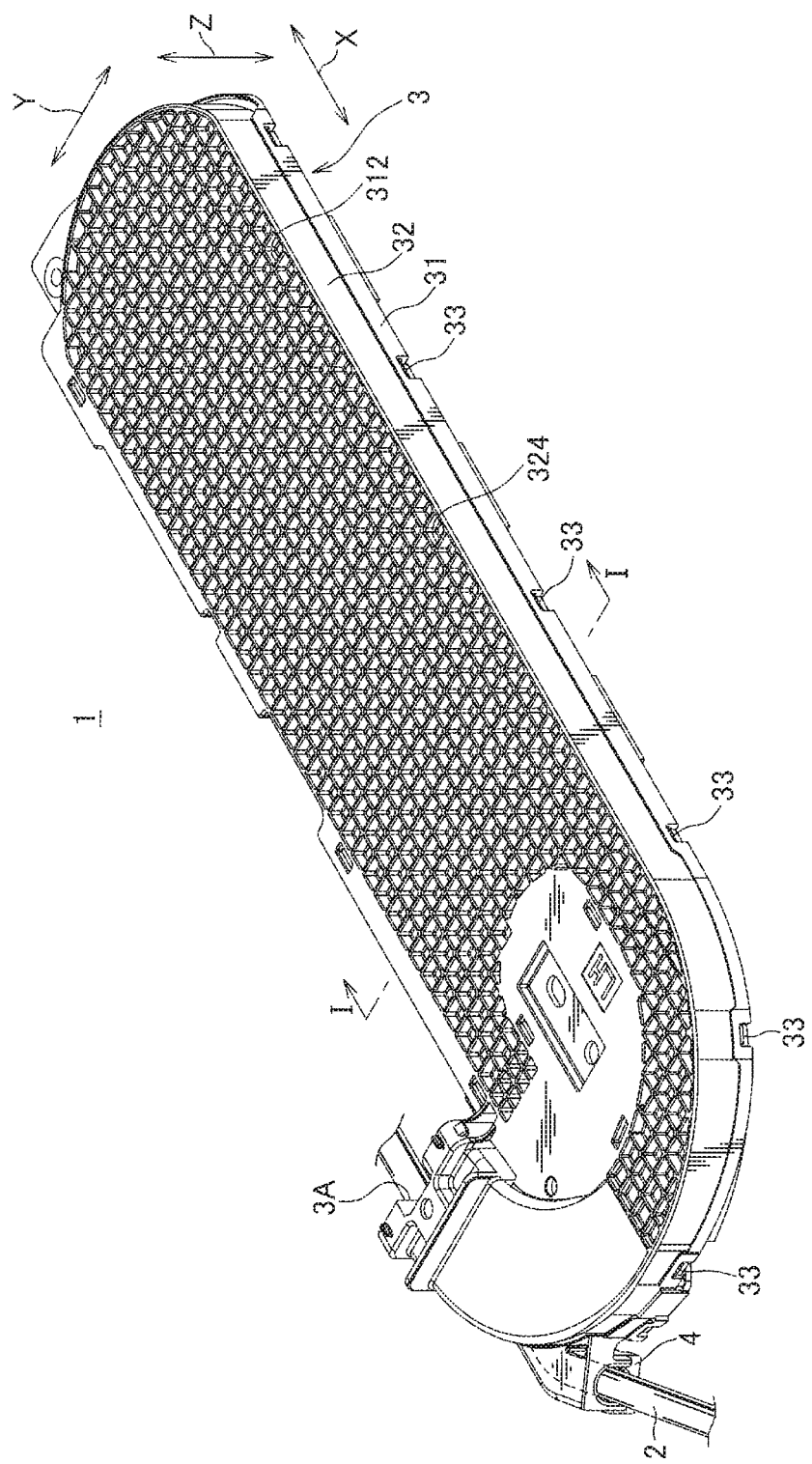
FIG. 4 is a perspective view showing the power supply device shown in FIG. 3.

The power supply device 1 of the present embodiment, that is to supply power to the slide sheet S provided on the vehicle floor 100, as shown in FIGS. 3 and 4, is provided with a wire harness 2 (shown in FIG. 4), and a case 3. In the drawings, the longitudinal direction of the vehicle is defined as the X direction, the width direction of the vehicle the Y direction, and the vertical direction the Z direction. That is, when the XY plane becomes the surface along the vehicle floor 100.

Figure 5:
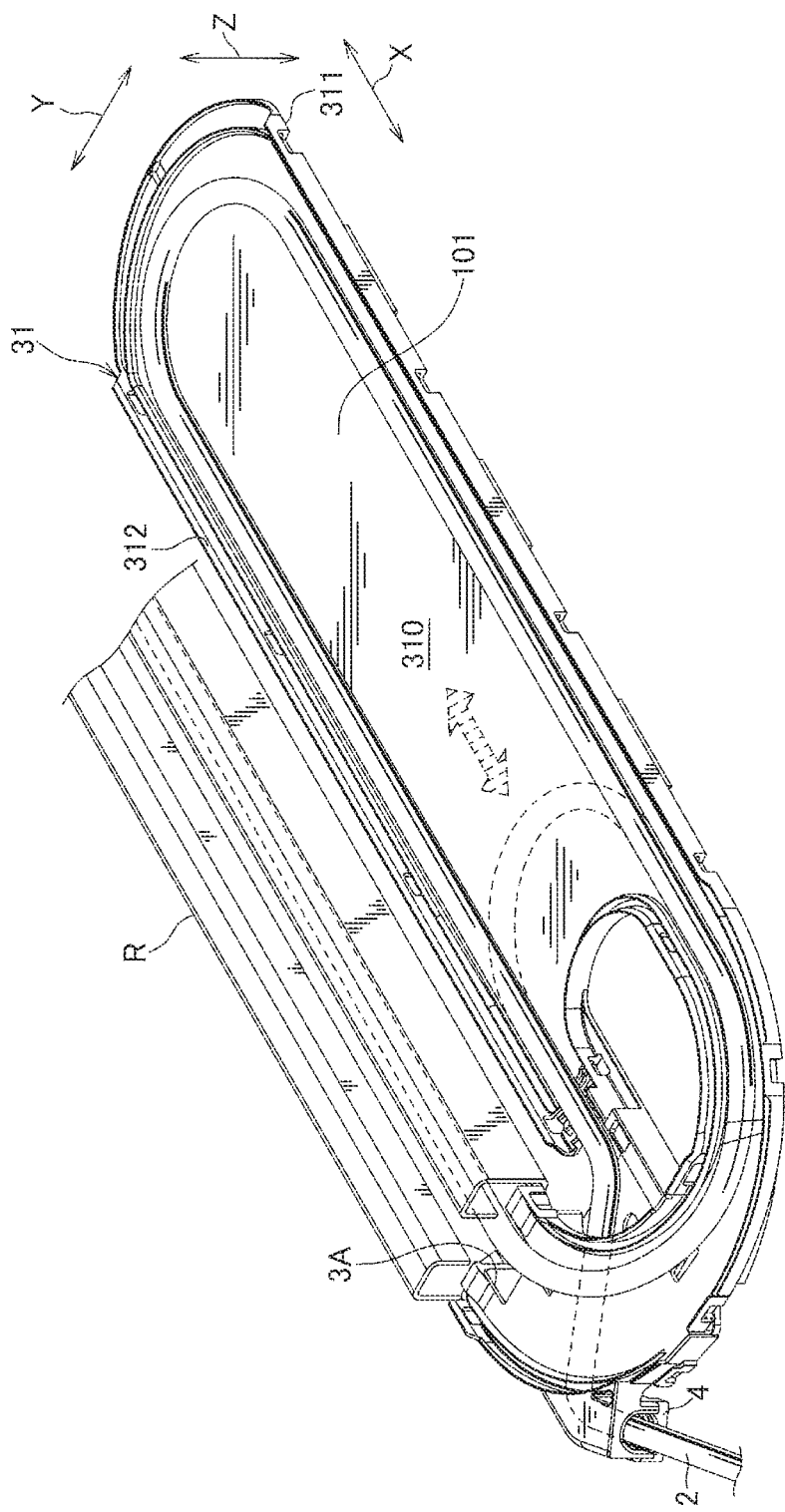
FIG. 5 is a perspective view showing a base portion of the case and the seat rail.

As shown in FIGS. 4 and 5, the wire harness 2 has an appropriate shape and is accommodated in the case 3, and a load side end portion (not shown) is led out from a load side lead-out portion 3A of the case 3 to be described later, and a power supply side end portion (not shown) is led out from a power supply side lead-out portion 4. Of the wire harness 2, the portion led out from the load side lead-out portion 3A is guided toward the slide seat S through an inside of the slide sheet S. The slide sheet S slides to change the seat position, the wire harness 2 led out from the load side lead-out portion 3A changes in length. More specifically, the load side end portion of the wire harness 2 led out from the load side lead-out portion 3A is guided toward the slide seat S through a slider S2 for power supply that is connected with the seat slider S1 shown in FIG. 3 and slidably moves. In FIGS. 4 and 5, although one wire harness 2 is shown, the wire harness 2 may be composed of a plurality of wire harnesses.

The load side end portion of the wire harness 2 is electrically connected to unillustrated electrical equipment provided at the slide seat S (an electric moving mechanism for sliding the slide sheet S, a massage machine, a speaker or the like). The wire harness 2 led out from the power supply side lead-out portion 4 is connected (not shown) to a power source such as a battery mounted on the vehicle. In this way, the electrical equipment of the slide sheet S is connected to the power supply via the wire harness 2, and electric power is supplied As shown in FIGS. 3 and 4, the case 3 is formed into a flat box shape along the XY plane, rectangular rounded flat, and having the X direction as the longitudinal direction, and is disposed adjacent to the seat rail R extending along the X direction. When the slide sheet S is guided by two seat rails R arranged in the Y direction, the case 3 may be provided between the two seat rails R.

Figure 8:
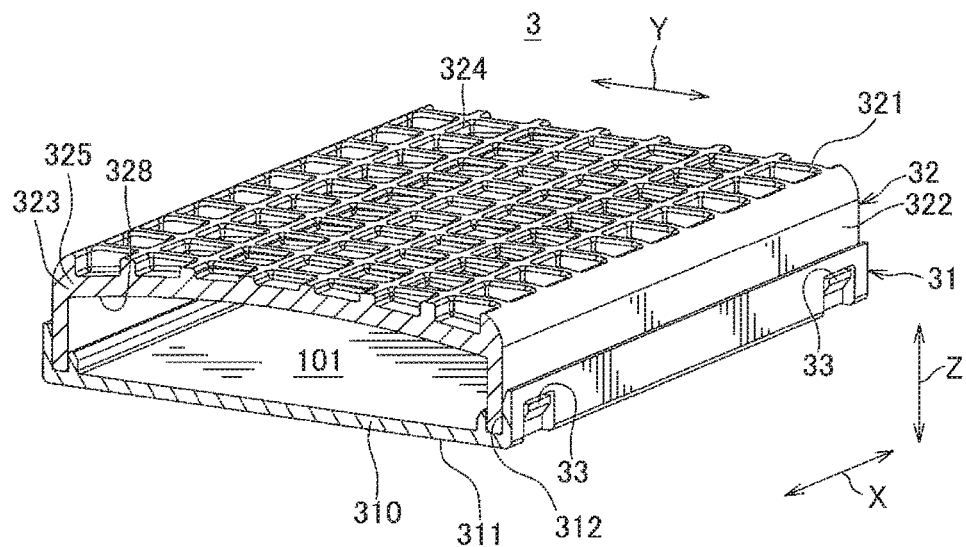
FIG. 8 is a perspective view showing a section taken along the line I-I in FIG. 4.
Figure 9:
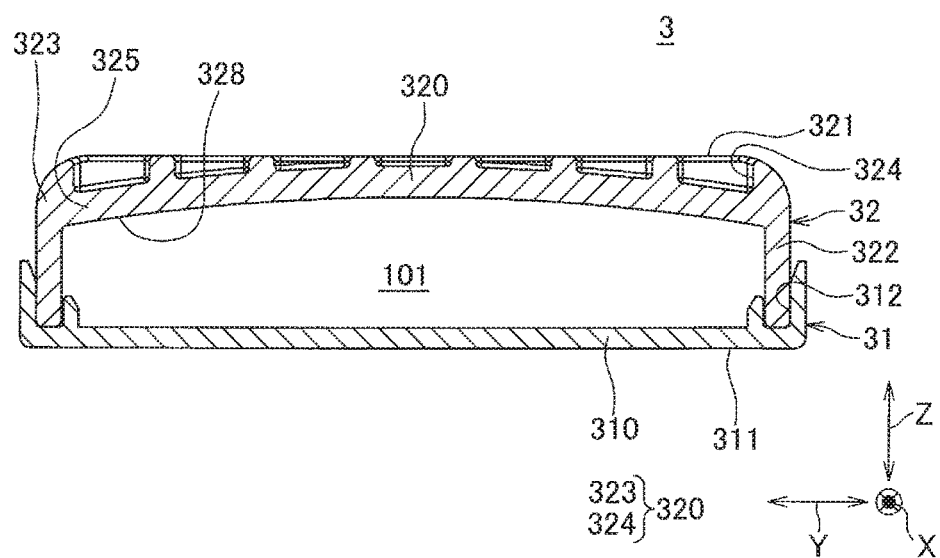
FIG. 9 is a cross-sectional view of FIG. 8 as viewed from one side in the X direction.

As shown in FIGS. 4 to 7, the case 3 includes a base portion 31 (shown in FIGS. 4 and 5), a cover 32 (shown in FIGS. 4, 6, and 7) covering the base portion 31 from above, and a lock 33 (shown in FIG. 4) for locking the base portion 31 and the cover 32. The base portion 31 is placed on the vehicle floor 100. Between the base portion 31 and the cover 32, as shown in FIGS. 8 and 9 formed is an accommodating chamber 101 for accommodating the wire harness 2. The base portion 31, the cover 32 and the lock 33 are made of, for example, insulating resin.

As shown in FIG. 5, the lower surface 311 of the base portion 31 is formed in a planar shape, and is disposed on the vehicle floor 100. Further, as shown in FIGS. 8 and 9, the base portion 31 has a lower wall 310 including a lower surface 311 and an insertion groove 312 standing up from the peripheral edge of the lower wall 310 and allowing each of peripheral wall 322 of the cover 32 to be described later to insert into the insertion groove 312.

As shown in FIG. 9, an upper surface (outer surface) of the cover 32 is formed in a flat shape, and becomes a placement surface 321 on which the floor mat (not shown) is placed. This cover 32 includes an upper wall 320 including the placement surface 321 and a peripheral wall 322 continuous to a peripheral edge of the upper wall 320.

Figure 6:
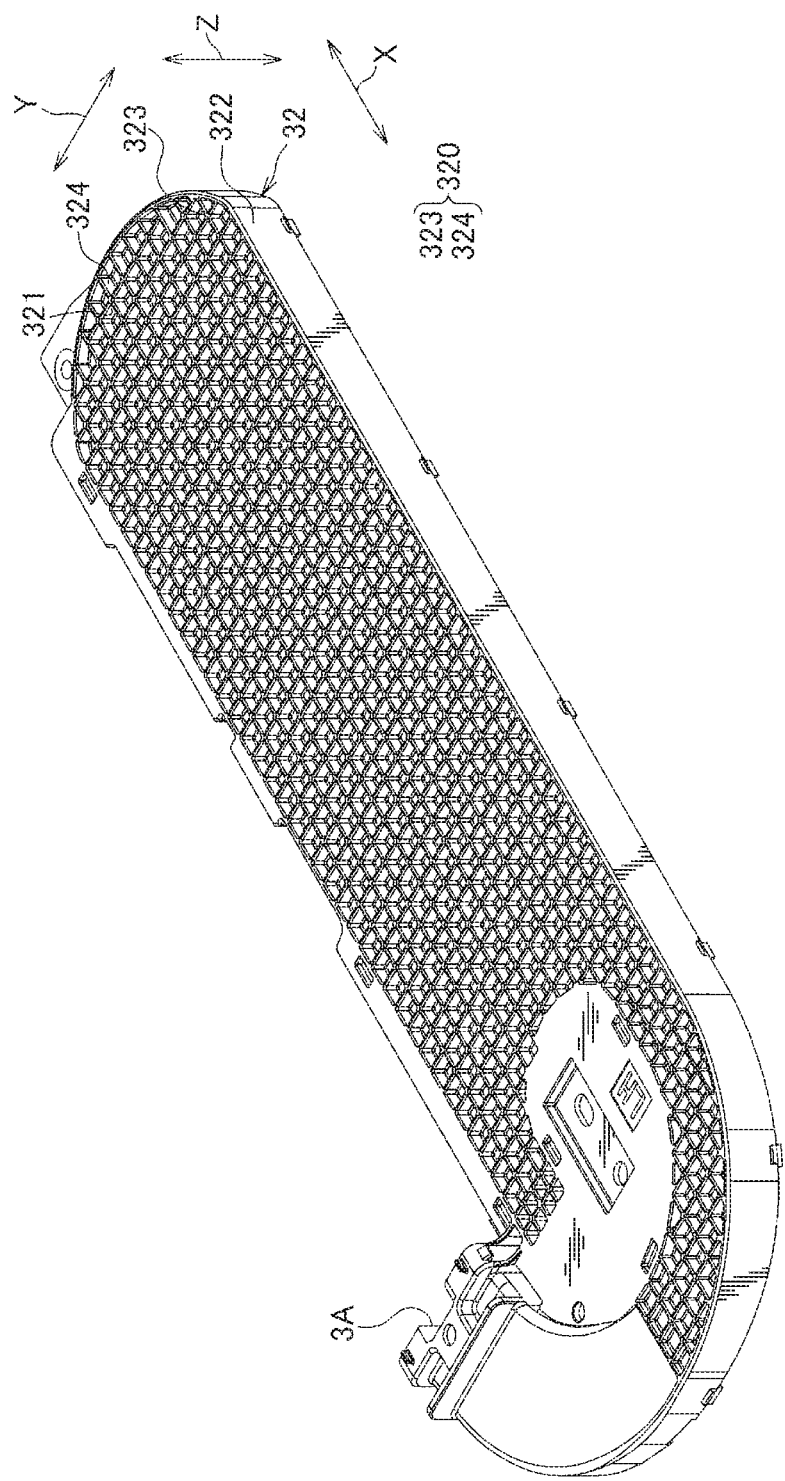
FIG. 6 is a perspective view of a cover of the case as seen from the outer surface side.

As shown in FIG. 6, the upper wall 320 includes a board 323, and a lattice-shaped rib portion 324 (reinforcing rib portion) formed to protrude from the board 323.

Figure 7:
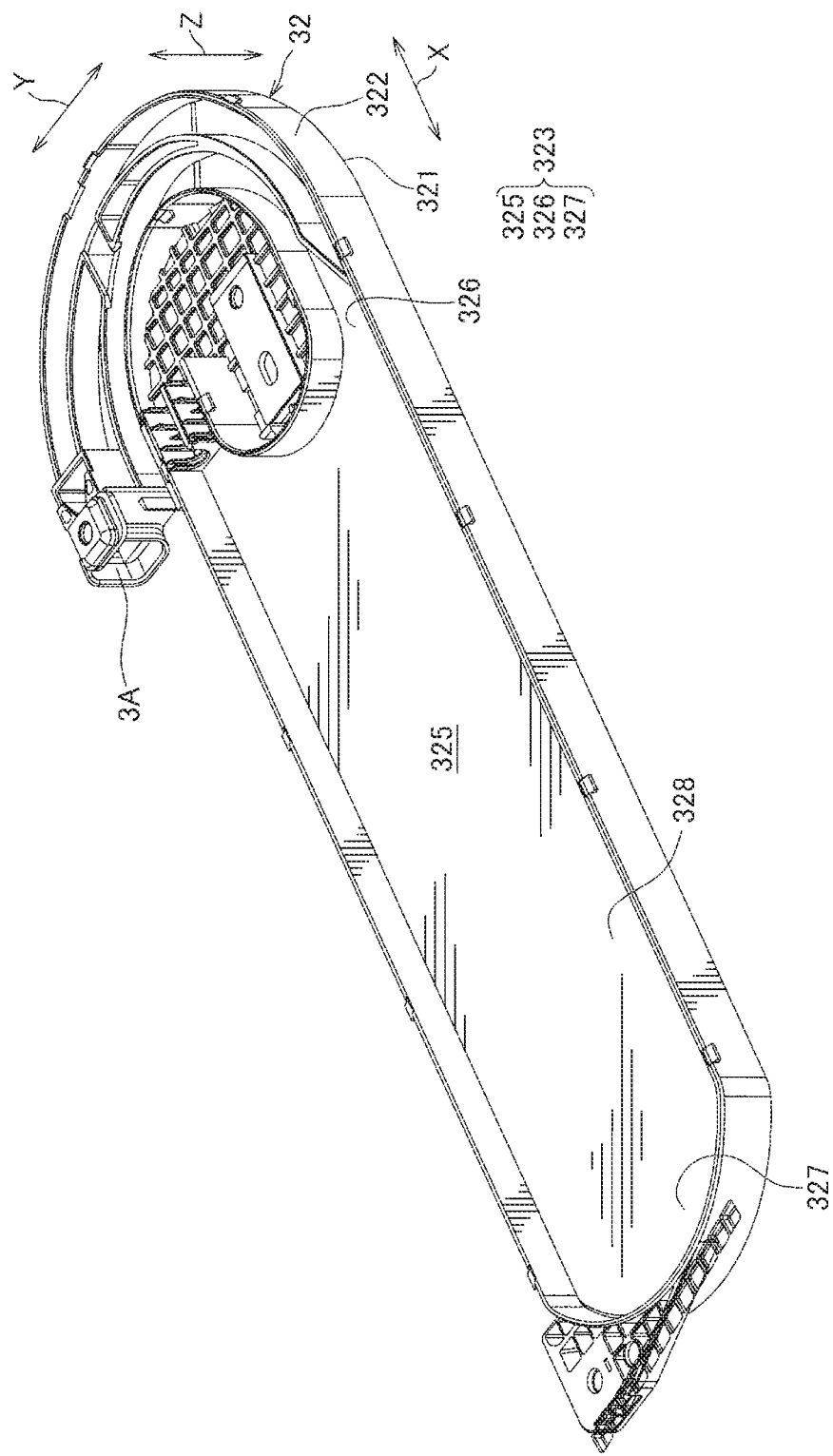
FIG. 7 is a perspective view of the cover of the case as seen from the inner surface side.

As shown in FIG. 7, the board 323 includes a board long portion 325, a board function portion 326 continuous to an end side (for example, the rear side) of the board long portion 325 in the X direction, and a board semicircular portion 327 continuous to another end side (for example, the front side) of the board long portion 325 in the X direction. The board long portion 325 is located at a center of the board 323 in the X direction, and is provided in a substantially rectangular shape in the plan view. The board function portion 326 is configured to include a load side lead-out portion 3A to be described later.

As shown in FIGS. 8 and 9, an inner surface 328 of the board long portion 325 on the side of the accommodating chamber 101 is formed in a concave arch shape in the short side direction (Y direction). Also, the board long portion 325 is formed in such a manner that a cross section orthogonal to the long side direction (arrow X) has substantially the same shape at any position.

The rib portion 324 is formed substantially over the entire upper surface of the board 323. In addition, as shown in FIG. 9, the rib portion is formed in such a manner that dimension thereof becomes larger as approaching the end portions in the Y direction (short side direction) as the upper ends thereof are positioned on the same plane.

Further, as shown in FIG. 4, on one end side in the X direction of the case 3 (for example, a rear side), the load side lead-out portion 3A which is open toward another end side (front side) so as to draw out the wire harness 2. The load side lead-out portion 3A is provided so as to be continuous with one end of the seat rail R, so that the wire harness 2 led out from the load side lead-out portion 3A is introduced into the seat rail R.

Further, as shown in FIG. 4, on the one end side in the X direction (for example, the rear side) of the base portion 31, the power supply side lead-out portion 4 is formed. The power supply side lead-out portion 4 is formed in a rectangular tube shape, and leads out an end (power source side end portion) of the wire harness 2 on the side to be connected to the battery.

Figure 10A:
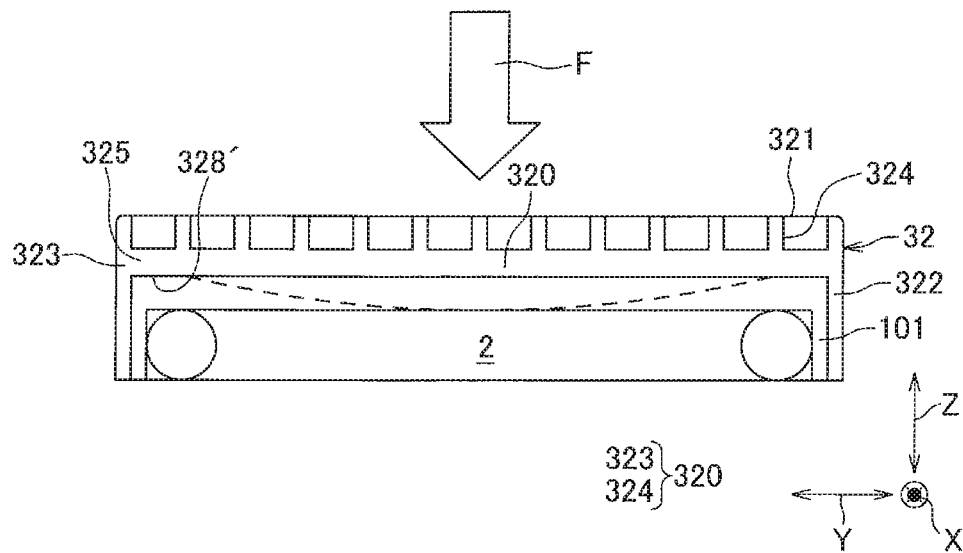
FIG. 10A is a view for explaining an operation and an effect of the present invention, in which a load is applied from above to a conventional case.
Figure 10B:
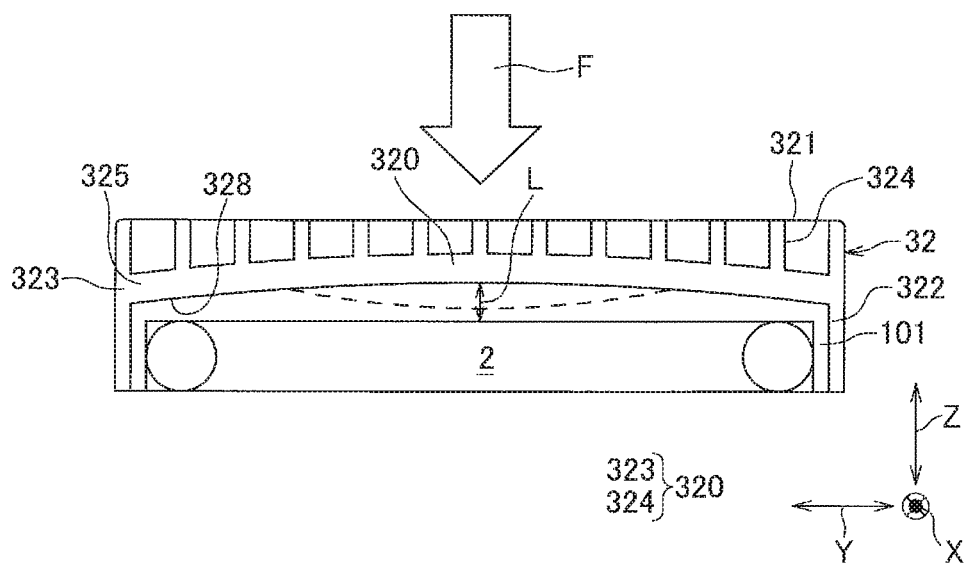
FIG. 10B is a view for explaining the operation and the effect of the present invention, in which the load is applied to the case of the present invention from above.

According to this embodiment as described above, there are the following effects. That is, the wire harness 2 (the article) and the case 3 are provided, the wire harness 2 is provided on the vehicle floor 100, electrically connects the power source and the slide seat S (slide body) of the vehicle, and supplies power to the slide seat S (slide body). A length of the wire harness 2 accommodated in the accommodation chamber 101 changes (see FIG. 5), accompanying the slide movement of the slide sheet S. Therefore, as shown in FIG. 10A, when the case 3 is stepped on and the like, and the load F acts on the case 3, there is conventionally concern that the upper wall 320 of the case 3 deflects and the inner surface 328 thereof contacts the wire harness, hindering the displacement of the surplus portion of the wire harness 2 (that is, the displacement of the wire harness in the accommodation chamber 101). In the present embodiment, as shown in FIG. 10B, the case 3 is provided with the upper wall 320, and the inner surface 328 of the upper wall 320 on the side of the accommodating chamber 101 is formed concavely, so as to suppress the application of the load F to the wire harness 2. Accordingly, while suppressing up sizing of the case 3 in the height direction (Z direction), it is also possible to suppress the load F from being applied to the wire harness 2 housed in the chamber 101 when the external force is applied.

Further, as shown in FIG. 10B, the upper wall 320 includes a long side direction (X direction) and a short side direction (Y direction), and the inner surface 328 of the upper wall 320 has an arcuate shape in the short side direction (Y direction). Accordingly, since the distance L between the wire harness 2 (article) and the central portion of the upper wall 320 in the short side direction is made larger than the end portion, it is possible to suppress the application of the load F to the wire harness 2 even if the upper wall 320 bends in the short side direction.

Further, the rib portion 324 (reinforcing rib portion) is formed on the placement surface 321 (outer surface) of the upper wall 320. Accordingly, it is possible to improve the strength against the load F applied from above the upper wall 320.

Further, the rib portions 324 (reinforcing rib portion) are formed so that their upper ends are located on the same plane. That is, they are formed to have a larger extension dimension as the rib portions 324 move toward the end portion in the Y direction (short side direction). Thus, it is possible to further improve strength of the upper wall 320.

It is to be noted that the present invention is not limited to the above embodiment, but includes other configurations where the object of the present invention can be achieved, and the following modifications and the like are also included in the present invention.

For example, in the above-described embodiment, the wire harness 2, as an example of an article, is provided on the vehicle floor 100, and is used for electrically connecting the power source to the slide member S (slide member) of the vehicle, so as to supply power to the slide seat S (slide body), but the present invention is not limited to this. For example, electric components including electric speakers mounted on the vehicle, electric parts, electric wiring (signals, information, electric (a concept including a conducting wire through which signal, data or electricity (power or electric signal) is transmitted or an optical fiber transmitting optical signals) are also involved. Further, in a state where the article is accommodated in the accommodating chamber, the upper surface of the article and the inner surface 328 of the upper wall 320 may gradually increase towards the center in the Y direction. Here, as an example of the article, in a case where a vehicle-mounted speaker is accommodated in the accommodating chamber 101, a plurality of small holes are formed in the upper wall 320 in order to facilitate the emission of sound from the speaker.

Figure 11:
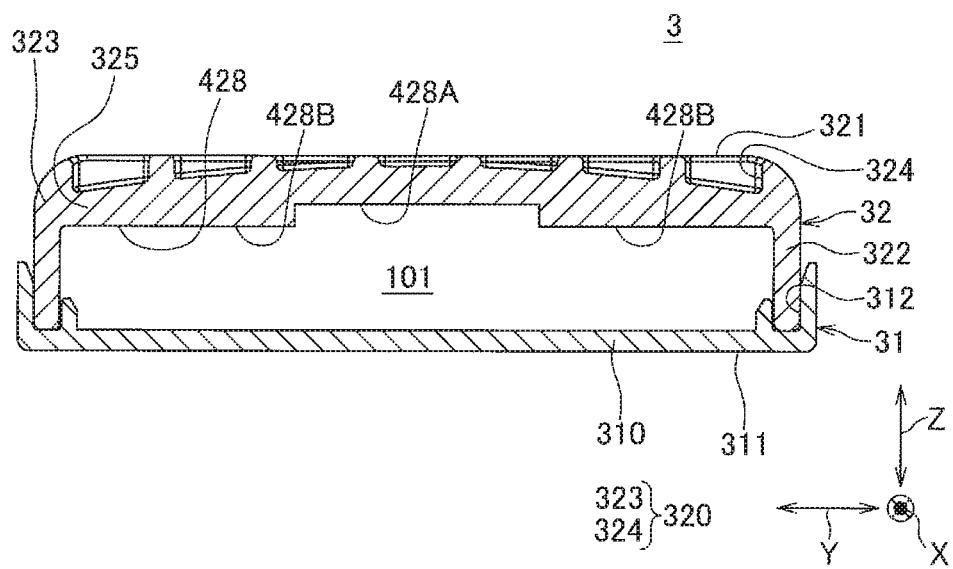
FIG. 11 is a cross-sectional view showing a modified example of the case of the present embodiment.
Figure 12:
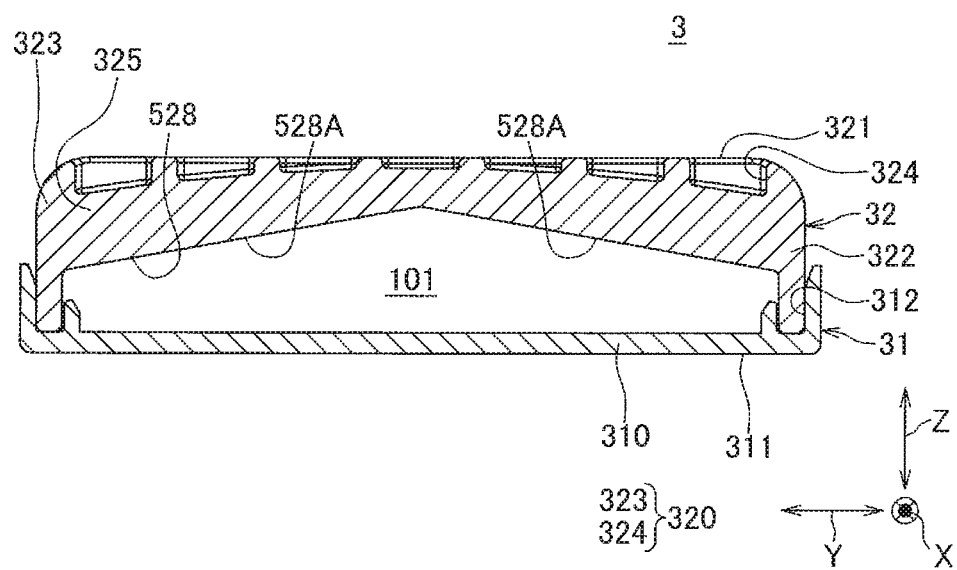
FIG. 12 is a cross-sectional view showing a modified example of the case of the present embodiment.

Further, in the above-described embodiment, the inner surface 328 of the board long portion 325 on the side of the accommodating chamber 101 is, as shown in FIGS. 8 and 9, formed in concave arch shape in the short side direction (Y direction). In other words, the inner surface 328 of the board long portion 325 on the accommodation chamber 101 side is formed of concave curved surface continuing from one end to the other end in the short side direction (Y direction), but the present invention is not limited to this. The inner surface 328 of the board long portion 325 on the side of the accommodating chamber 101 may be formed with only the central portion in the direction (Y direction) being formed as the concave curved surface. Also, as shown in FIG. 11, the inner surface 428 of the board long portion 325 on the accommodation chamber 101 side may have the center portion 428A in the short side direction (Y direction) formed stepped including a plane located higher than the end portion 428 B, and as shown in FIG. 12, may have the inner surface 528 of the board long portion 325 on the side of the accommodating chamber 101 formed of inclined surfaces 528A and 528A inclining upward toward the center portion in the short side direction (Y direction). FIGS. 11 and 12 show a cross-sectional view showing a modified example of the case of the present embodiment. Members having substantially the same function or substantially the same configuration as in the previous embodiment are denoted by the same reference numerals, and description thereof is omitted.

In the above-described embodiment, the lattice shaped rib portion 324 formed of the protrusion from the board 323 is formed as the reinforcing rib portion, but the present invention is not limited thereto. Reinforcing rib part may have a structure or a shape reinforcing the board 323. For example, as reinforcing rib portions, linear ribs in the X direction may be formed side by side in the Y direction, linear ribs in the Y direction may be formed side by side in the X direction, or a plurality of protrusions may be formed in a scattering pattern.

Further, in the above embodiment, the case 3 is along the XY plane and is formed into the flat plate shape having the rectangular round shape as the X direction is the longitudinal direction, and the inner surface 328 of the upper wall 320 is arched in the direction (Y direction), but the present invention is not limited to this. The inner surface of the wall may be in the shape of an arch in the long side direction (X direction), or both the short side direction (Y direction) and the short side direction (X direction) may be arched. In addition, although the upper wall 320 is formed in the rectangular round shape as the X direction is the longitudinal direction, but the present invention is limited to this. The upper wall 320 may be formed in a square shape (rounded corner).

In the above embodiment, the case 3 includes the base portion 31, the cover 32, and the lock 33 for locking the cover 31 and the cover 32. However, the present invention is limited to this. The case may be constituted only by the cover 32, and the cover 32 is provided on the placement surface, and the accommodating chamber for accommodating articles may be formed in the interior.

In addition, the best configurations, methods, and the like for carrying out the present invention are disclosed in the above description, however, the present invention is not limited to this. That is, the present invention is mainly illustrated and described specifically with respect to a specific implementation, it is to be understood that various modifications can be made by those skilled in the art in the shape, material, quantity, and other details to the above described embodiments without departing from the spirit and scope of the present invention. Therefore, since the description that limits the shape and material disclosed in the above is described in order to facilitate the understanding of the present invention, but does not limit the present invention, the description with the name of the member of which part or all of the limitations on the shape, material, etc. thereof is excluded is included in the present invention.

REFERENCE SIGNS LIST 1 power supply device
2 wire harness (article)
3 case
100 vehicle floor
101 accommodating chamber
320 upper wall
324 rib portion (reinforcing rib portion)
328, 428, 528 inner surface of the upper wall
S slide seat (slide body)
X long side direction
Y short side direction
F load

The invention claimed is:

1. A power supply device, comprising:
  an article; and
  a case with an accommodating chamber for accommodating the article, wherein the case comprises an upper wall that is configured to have a load act from above,
  an inner surface of the upper wall facing the accommodating chamber is formed into a concave shape,
  the article is a wire harness provided on a vehicle floor and electrically connecting a power source and a slide body of a vehicle so as to supply power to the slide body, and
  the wire harness is accommodated in the accommodating chamber and changes in length as the slide body slides.

2. The power supply device according to claim 1, wherein the inner surface of the upper wall is arched.

3. The power supply device according to claim 2, wherein a long side direction and a short side direction are defined on the upper wall, and
  the inner surface of the upper wall is arched in the short side direction.

4. The power supply device according to claim 1, wherein a reinforcing rib portion is formed on an outer surface of the upper wall.

5. The power supply device according to claim 2, wherein a reinforcing rib portion is formed on an outer surface of the upper wall.

6. The power supply device according to claim 3, wherein a reinforcing rib portion is formed on an outer surface of the upper wall.

7. The power supply device according to claim 4, wherein the reinforcing rib portion is formed such that an upper end thereof is positioned on a same plane.

8. The power supply device according to claim 5, wherein the reinforcing rib portion is formed such that an upper end thereof is positioned on a same plane.

9. The power supply device according to claim 6, wherein the reinforcing rib portion is formed such that an upper end thereof is positioned on a same plane.

* * * * *